(12) United States Patent
Earhart et al.

(10) Patent No.: US 11,949,456 B2
(45) Date of Patent: Apr. 2, 2024

(54) SYSTEMS AND METHODS FOR COMMUNICATION BY WAVELENGTH TOGGLING

(71) Applicant: Ball Aerospace & Technologies Corp., Boulder, CO (US)

(72) Inventors: Ronald P. Earhart, Arvada, CO (US); Kevin L. Whiteaker, Erie, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 17/871,748

(22) Filed: Jul. 22, 2022

(65) Prior Publication Data

US 2022/0376793 A1 Nov. 24, 2022

Related U.S. Application Data

(63) Continuation-in-part of application No. 16/806,903, filed on Mar. 2, 2020.

(60) Provisional application No. 62/812,434, filed on Mar. 1, 2019.

(51) Int. Cl.
| | |
|---|---|
| *H04B 10/50* | (2013.01) |
| *G02B 27/10* | (2006.01) |
| *H04B 10/516* | (2013.01) |
| *H04B 10/572* | (2013.01) |
| *H04B 10/67* | (2013.01) |

(52) U.S. Cl.
CPC ....... *H04B 10/503* (2013.01); *G02B 27/1006* (2013.01); *H04B 10/516* (2013.01); *H04B 10/572* (2013.01); *H04B 10/675* (2013.01)

(58) Field of Classification Search
CPC .. H04B 10/503; H04B 10/516; H04B 10/572; H04B 10/675; H04B 10/50; H04B 10/1123; H04B 10/506; G02B 27/1006; G02B 26/007; H04J 14/02; H04J 14/005; H04J 14/08; G01S 7/484; G01S 7/4815; G01S 17/86

See application file for complete search history.

(56) References Cited

U.S. PATENT DOCUMENTS

| | | | |
|---|---|---|---|
| 7,046,928 B1 | 5/2006 | Bradford et al. | |
| 8,184,270 B1 | 5/2012 | Billmers et al. | |
| 9,645,291 B1 * | 5/2017 | Sommer | ............ G01N 21/6458 |
| 10,841,007 B1 | 11/2020 | Carlson | |
| 10,845,480 B1 * | 11/2020 | Shah | ....................... G01S 17/10 |

(Continued)

OTHER PUBLICATIONS

U.S. Appl. No. 16/806,903, filed Mar. 2, 2020, Earhart et al.

(Continued)

*Primary Examiner* — Hibret A Woldekidan
(74) *Attorney, Agent, or Firm* — Sheridan Ross P.C.

(57) ABSTRACT

A system for communication is provided. The system includes an emitter transmitting a first code of a first wavelength. The system includes a filter or variable waveplate receiving the first code. The system includes a receiver sensor receiving the filtered first code. The system includes the emitter transmitting a second code of a second wavelength. The system includes the variable waveplate or other filter receiving the second signal. The system includes the receiver sensor receiving the filtered second code. The first and second codes may be used for communication, synchronizing the emitter, and other purposes.

18 Claims, 13 Drawing Sheets

(56) References Cited

U.S. PATENT DOCUMENTS

| | | |
|---|---|---|
| 2007/0221849 A1 | 9/2007 | Tabirian et al. |
| 2009/0122295 A1* | 5/2009 | Eaton .................. G01C 11/025 342/357.31 |
| 2009/0214221 A1 | 8/2009 | Li et al. |
| 2010/0188492 A1* | 7/2010 | Jacobsen ............ A61B 1/00188 348/E7.085 |
| 2016/0381441 A1* | 12/2016 | Nagamine ............ H04B 10/503 398/95 |
| 2018/0284228 A1* | 10/2018 | LaChapelle ............. G01S 17/42 |
| 2019/0079171 A1 | 3/2019 | Hwang et al. |
| 2019/0346537 A1 | 11/2019 | Krelboim et al. |

OTHER PUBLICATIONS

Havermeyer et al., "Miniature Self-Aligned External Cavity Tunable Single Frequency Laser for THz Generation," Proceedings of the Society of Photo-Optical Instrumentation Engineers, vol. 8261, 2012, 7 pages.

North et al., "Analysis of Self-Pulsating Sources Based on Cascaded Regeneration and Soliton Self-Frequency Shifting," IEEE Journal of Selected Topics in Quantum Electronics, vol. 20, No. 5, Sep. 2014, 7 pages.

Official Action for U.S. Appl. No. 16/806,903, dated Nov. 22, 2022, 19 pages.

Official Action for U.S. Appl. No. 16/806,903, dated Mar. 16, 2023, 22 pages.

* cited by examiner

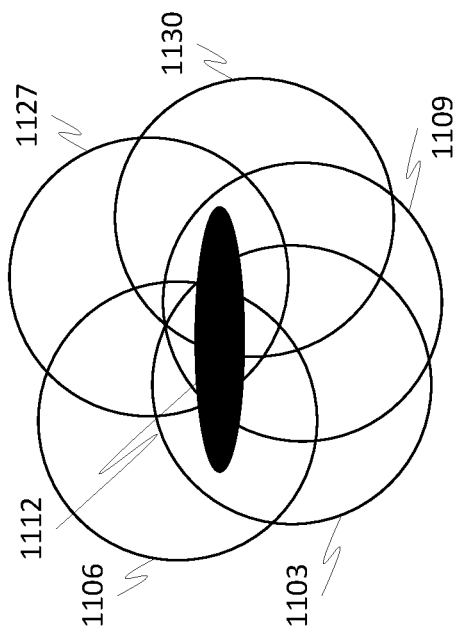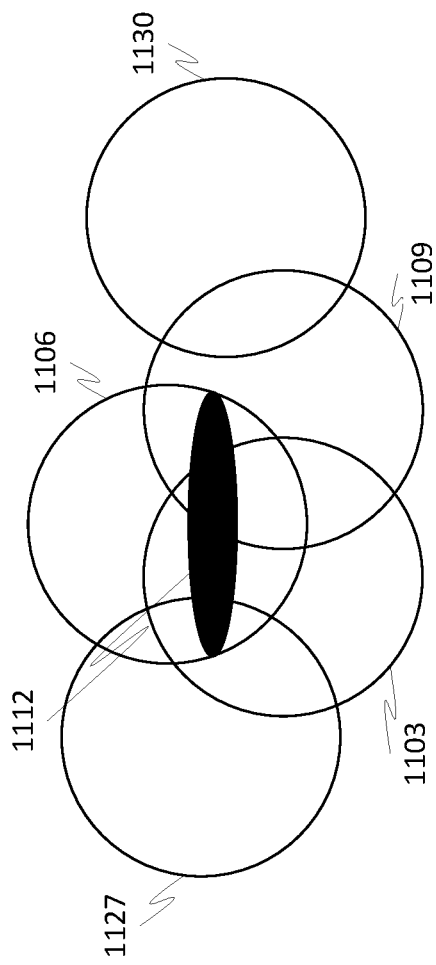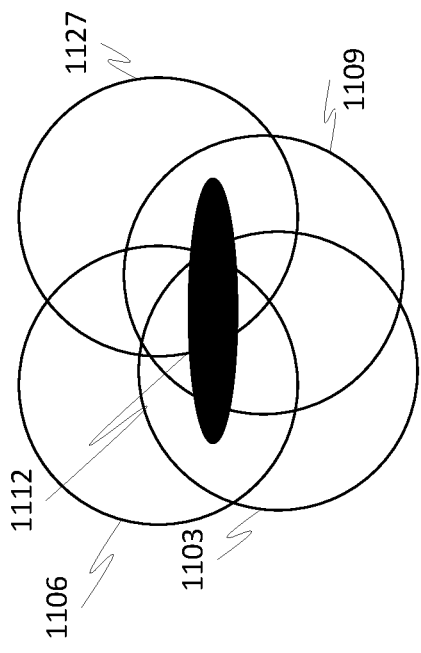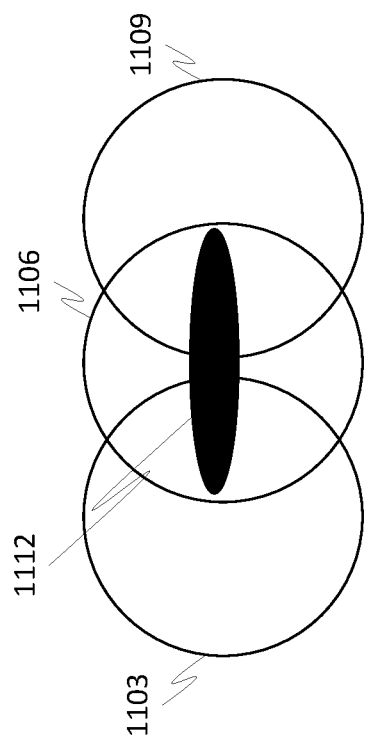

SYSTEMS AND METHODS FOR COMMUNICATION BY WAVELENGTH TOGGLING

CROSS REFERENCE TO RELATED APPLICATION

The present application is a continuation-in-part of U.S. application Ser. No. 16/806,903, entitled "SYSTEMS AND METHODS FOR NOISE REDUCTIONS IN LIDAR SENSING OF A TARGET BY WAVELENGTH TOGGLING AND FILTERING," filed Mar. 1, 2020, which claims the benefits of and priority, under 35 U.S.C. § 119(e), to U.S. Provisional Application Ser. No. 62/812,434, filed Mar. 1, 2019, entitled "SYSTEMS AND METHODS FOR NOISE REDUCTIONS IN LIDAR SENSING OF A TARGET BY WAVELENGTH TOGGLING AND FILTERING," which is incorporated herein by this reference in its entirety for all that it teaches and for all purposes.

FIELD

The present disclosure is generally directed to a laser system and more particularly to a Lidar system capable of providing a means for communication.

BACKGROUND

Lidar (also called LIDAR, LiDAR, and LADAR) is a method of measuring a distance to a target by emitting laser light toward the target and measuring the reflected laser light with a receiver or other sensor. The amount of time the laser light takes to reach the receiver as reflected laser light can then be used to determine a distance to the target, make digital 3-D representations of the target, or to determine other information relating to the target. Lidar systems have terrestrial, airborne, mobile, and other applications.

The performance of a Lidar system is typically strongly related to the signal-to-noise ratio ("SNR") of the system. This is especially true in Geiger Mode ("GM") Photon Counting ("PC") Lidar systems where background noise signals can blind the system from the actual target signal. Such background noise signals are typically dominated by backscattering of light from a backscattering medium, such as shared optics or particulates, at closer ranges than the target. As the range from the target to the backscattering medium reduces, the amplitude of the noise increases dramatically. While newer Lidar sensors may have significantly higher frame rates, and such sensors have the potential to provide significant performance improvements, higher frames rates can result in a reduction in the backscattering range, and therefore, an increase in the amplitude of the noise. To take full advantage of new sensors with high frame rates, an efficient and effective approach to backscatter mitigation is needed.

Some contemporary Lidar systems delay the time between a laser pulse and an integration gate to minimize how much backscatter was collected by the sensor. Such systems result in lower frame rates for the camera and longer integration times. A major drawback of lowering the pulse repetition frequency ("PRF"), is a reduction in the data collection rate. This limitation eliminates any advantage of higher frame rate cameras. This limitation also reduces any advantages of running the laser at higher PRF.

Lasers used for Lidar applications are typically more efficient at higher PRF, meaning that the lasers have a higher efficiency per datapoint collected. In addition, these lasers tend to be peak power (energy per pulse) limited, but not average power (energy per pulse*PRF) limited. Thus, a higher PRF can allow for the integration of more pulses in a single time period, which can have the effect of increasing the integrated SNR.

Contemporary systems may use a burst waveform to mitigate backscatter. For example, a burst waveform may consist of a lower macro pulse rate of fire (PRF) laser, with each macro pulse consisting of a burst of pulses (micro pulses). The low frequency of the macro pulse provides greater distance between pulses and can reduce system backscatter. The micro pulses allow for several low power pulses which can provide multiple detection events, increasing the SNR of a given time period. However, this approach does not work with high frame rate cameras and requires streaming sensors which are less common and more difficult to process due to time scale. Burst lasers are also more complicated and less efficient due to the major variation in the thermal environment and increase in peak power or peak pumping.

Some contemporary systems reduce the PRF so that the backscatter does not blind the receiver when the expected target reflections are being received. These contemporary systems operate in a type of burst mode. These systems are overall generally complicated, and the laser has to produce burst mode which pushes the laser away from a near continuous operation. This reduces the laser efficiency and requires higher peak power lasers to provide the same detection range. This higher power also reduces the kinds of laser that can be used and increases the challenges with optical coatings.

Some systems attempt to leverage polarization to reduce the signal level, but depolarization from scattering reduces the effectiveness as there is still a significant level of backscatter relative to single photon counting systems.

BRIEF DESCRIPTION OF THE DRAWINGS

FIGS. 11A-11H are illustrations of a target in accordance with one or more embodiments of the present disclosure.

DETAILED DESCRIPTION

Figure 1:
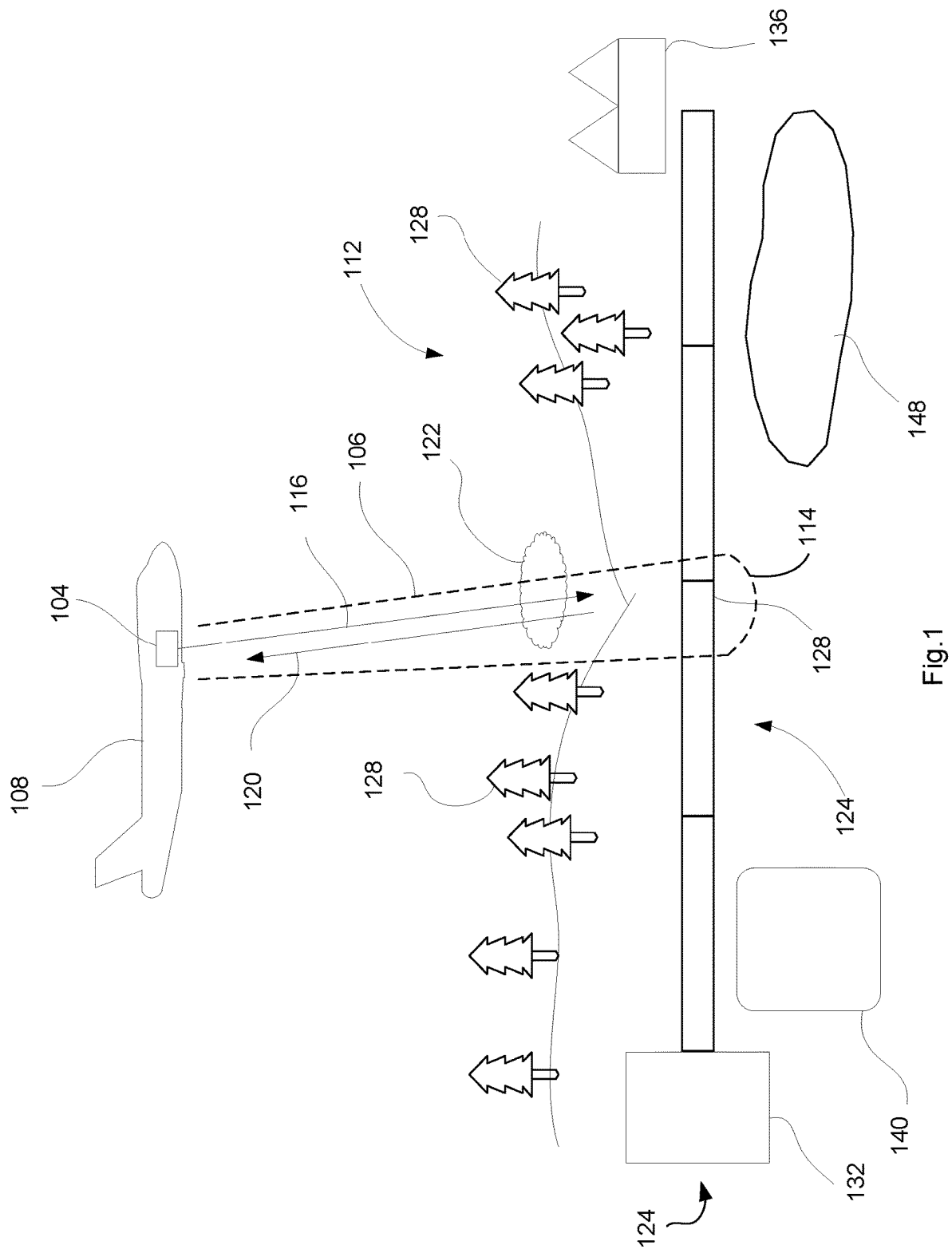
FIG. 1 depicts a system incorporating a Lidar system for detecting a position of a target from a plane in accordance with embodiments of the present disclosure.

What is needed is a system capable of increasing the SNR and the range reach of a Lidar system. As described herein, a unique and novel system may be provided to greatly increase the range reach of a Lidar system by filtering dominant noise source through spectral toggling. Also, disclosed systems can utilize simple and high-PRF lasers with lower peak power than are required by burst waveform lidar systems. Embodiments as described herein may use a high-power fiber laser which is typically 2-4 times more efficient than a solid-state laser, greatly reducing the size, weight, and power (SWAP) of a lidar system. A fiber front end does not preclude the ability to use a solid state amplifier when peak power is required. In some embodiments, a planar wave guide laser amplifier may be used. As described herein, a planar wave guide laser amplifier may be a hybrid solid state/fiber laser in one dimension. While description of the systems and methods herein may be described in relation to one particular type of laser system, such as a fiber laser, it should be appreciated that the same or similar methods and systems may be implemented using any type of laser system.

In some embodiments of the systems described herein, wavelength toggling of two or more wavelengths may be used in the transmit and receive paths of a Lidar system so that close range backscattered light and target reflected light are received by a sensor at different wavelengths. A high-speed switch on the receive side or a spectral/spatial separating optics can then filter out the close range backscatter light and collect only the long range target light. A graphical description, representing an example implementation, is described below. This approach looks like a wavelength-based time gate allowing the system to look at the light from any specific range while ignoring the noise from another range gate. Thus, it could also be used to ignore any noise at a given range relative to the target (before or behind). However, for most applications the noise is in the foreground. In some embodiments, a laser system may switch between emitting light of a first wavelength and emitting light of a second wavelength. In some embodiments, a laser system may switch between emitting light of a first band of wavelengths and emitting light of a second band of wavelengths. It should be appreciated that in the description herein any one wavelength may be replaced by light of a band of wavelengths as opposed to a single wavelength. For example, a laser system may be configured to dump several laser lines around a 1 nanometer band instead of using a laser at a single wavelength.

Wavelength Toggling also provides significant advantages for self-protection capability to a Lidar system with photon counting camera. A major challenge is Lidar system is they have been easily damaged or destroyed by optical over illumination arising from optical backscatter from the "outgoing" laser pulse or overpowering reflected pulses due to retroreflectors in the field of view. Wavelength toggling provides a way to eliminate that backscatter an outgoing laser pulse from reaching the sensor. The high PRF laser also allows for significantly (10 to 1000×) lower peak power pulses. These lower peak power pulses reduce the peak power of a retroreflected laser pulse greatly and reduce the change for damage in an operational application. Thus, wavelength toggle provides a robust way to protect the camera from damage, increasing it applicability.

As described herein, a Lidar system may be designed in such a way that greatly reduces the requisite size, weight, and power (SWAP) of a lidar system by enabling the use of a simple and high PRF laser with lower peak power than required by traditional or burst lidar systems. Laser size and thermal handling is also reduced significantly, which increase overall reliability. The low peak power laser pulse also reduces requirements on window/optical coatings, providing for much higher reliability system.

Embodiments of the Lidar system described herein incorporate multicolored lasers that toggle between wavelengths or wavelength bands at a much lower frequency than the fundamental PRF of an integrated Lidar. The wavelength separation between the bands may be of a sufficient wavelength to allow for the filtering on the receive optics and detector. The temporal frequency at which the wavelengths toggle may be sufficient to push the distance of the in-band backscattering noise further out.

In some embodiments, wavelengths bands used in the toggle may be comprised of multiple lasers which are combined to produce a small spectral band relative to a spectral toggling separation amount.

The received optics may incorporate a demultiplexing method to separate the different spectral signals from known noise ranges (e.g., close range backscatter) and desired range locations (e.g., range with target). This may be executed through the use of spectral filters and some periodically blocking elements (e.g., chopper, Pockels cell, acousto-optic modulator ("AOM"), etc.) or through spatial separation on the focal plane (Grading, etc.). While the disclosure describes specific switching architectures, it should be appreciated that other switching architectures are possible.

The transmission optical path of the Lidar systems described herein may include a multiplexing output to produce a wavelength toggling code and/or to reduce in band amplified spontaneous emission (ASE) light leakage as associated with many laser systems.

One potential application for Lidar systems is in connection with detecting a distance between the Lidar system and a target. As noted, air between the target and the Lidar system may include particles or other substances which may create noise in the signal. These substances can create a backscattering of the laser light emitted by the Lidar system and may lower the accuracy of any measurements generated by the Lidar system. Accordingly, mitigating such backscatter is of great interest. However, Lidar systems capable of mitigating backscatter while still being efficient in terms of size, weight, and power have been unavailable. In particular, a system that was of a reasonably small size, low weight, required low power and that provided suitable backscatter mitigation has been unavailable.

As described herein, Lidar systems and methods of using a Lidar system capable of providing self-protection to over-illumination may be created. Many contemporary Lidar systems have been damaged, for example by a cascade or fusing event where the whole sensor array is damaged, not just individual pixels, by optical backscattering when the laser fires. The present disclosure provides systems capable of self-protecting from over-illumination which may help mitigate optical backscattering when the laser fires.

Embodiments of the present disclosure provide a Lidar system capable of mitigating backscatter noise generated both in front of and behind a target. A Lidar system as described herein may use wavelength toggling to toggle between two or more wavelengths in the transmit and receive path of the Lidar system. In this way, backscattered light and light reflected off the target may be received by the sensor in different wavelengths.

Embodiments of the present disclosure make use of spectral toggling to filter noise created by a dominant noise source from a signal. A high speed switch on the receive side of the Lidar system may filter out backscatter light and collect only the target light.

Certain embodiments of the present disclosure are characterized by, for example:

1. including two or more laser seed diodes, each emitting lasers of different wavelengths, a wavelength filter switch to switch between each of the lasers, and a fiber laser amplifier to amplify the laser emitted from the wavelength filter switch;
2. making use of a wavelength filter switch at the receive side of the Lidar system to filter out received light at an unexpected wavelength;
3. providing an increased range reach of the Lidar system by filtering out noise from a dominate noise source;
4. utilizing simple and high PRF lasers with lower peak power than required by burst;
5. utilizing spectral toggling to provide improved self-protection from optical over illumination; and/or
6. providing improved weight, size, and power as compared to conventional Lidar systems.

As described herein, one or more embodiments of the present disclosure include using a wavelength toggling system as an optical communication system to transmit and receive data. The systems and methods described herein can be used to reduce background noise during two-way communication. Such systems and methods enable improvements in bandwidth as compared to contemporary methods of simultaneously transmitting and receiving data. By wavelength toggling as described herein, a form of code encoding is provided which can be used to synchronize a transceiver and/or to send additional data.

By wavelength switching at known or measurable frequencies as described herein, two communication systems can be synchronized while each communication system receives data at one wavelength and transmits data at another wavelength. By providing a higher signal-to-noise ratio, a system with lower size, weight, power, cost, etc. may be achieved and/or higher data rates may be enabled.

Because such a system may be enabled to transmit and receive data at different wavelengths, the system may be used to monitor position and velocity of other transceivers while transmitting data. Such a system may be used for multiple system optimization parameters. As an example, and not to be considered as limiting the disclosed systems and methods to any particular applications in any way, a system as described herein may be implemented by one or more self driving vehicles. Each vehicle may communicate an identifier, a current position, and a current velocity, among other information, to one or more other vehicles. Each vehicle may in this way share information by bouncing its signals off other vehicles to provide enhanced situational awareness. Such a vehicular system could serve as a way for a self driving vehicle to see the world and communicate with other vehicles about the vehicle's type, driving status, destination, and other information.

Certain embodiments as described herein provide a means for synchronizing two transceivers through the transmission of a signal even in the event that the signal is reflected or bounced off of an object. As described herein, wavelength toggling may be used to provide code encoding which can be used to synchronize transceivers and/or to send additional data. By sending signals of multiple wavelengths, a system can also be used to monitor a position of a transceiver while transmitting, improving pointing capabilities.

In accordance with one or more of the embodiments described herein, wavelength toggling may be used for code encoding and processing. Wavelength toggling, for example, may provide an orthogonal code option to temporal codes which may be used to reduce processing complexity. Temporal codes, for example, may be used in Lidar and communication systems to convey information, improve SNR, solve range/time ambiguity and/or prevent spoofing. Such temporal codes may be either in wavelength or amplitude pulse codes. Examples of wavelength codes include chirping, pulse codes including pseudo random noise, Golub, prime delay codes, etc. In some embodiments, the number of practical orthogonal/unique (non-overlapping) codes can be limited in an operational system due to constraints like laser energy build up time and camera reset/after pulsing. Wavelength toggling may enable the use of both wavelength and pulse codes together to expand the number and kinds of codes available.

Wavelength toggling can be used to simplify code processing by a factor of the number of wavelengths as fewer temporal codes can be used because the codes can be repeated at a different wavelength, allowing for separation of processing path and a reduction of potential sideband contributions.

Independent wavelength decorrelation processing of pulse codes may increase the sparsity in each domain allow for additional noise suppression and signal detection techniques.

In some embodiments, wavelength toggling may be used to separate multiple range gates or to monitor angular gates or multiple range gates. Since the transmitted signal/beam is encoded in time and wavelength, it can be used to probe and/or monitor various range gates more efficiently and improve the local SNR in that range gate. The near field or backscatter channel may also contain information that can be useful for a variety of applications. For example, the near field or backscatter channel may be used for the following: target detection and tracking at closer range; monitor environmental situation (atmospheric conditions, visibility, underwater turbidity, etc.); system monitoring for system parameters such optical window backscattering levels, boundary layer measurements, window affects; and enabling higher SNR which may allow for either lower system SWAPC or higher data rates. Multiple wavelengths can be used to monitor and/or track targets (e.g., multiple transmitters) at different range gates using a single detector which separates the wavelengths by spectrum on the detector. Multiple wavelength/temporal codes can be used to encode angular space and provide additional angular resolution about the target scene which can be used for a variety of system improvement or like centroiding or active divergence control.

Additional features and advantages of embodiments of the disclosed systems and methods will become more readily apparent from the following description, particularly when taken together with the accompanying drawings.

A remote sensor system or a light detection and ranging (LIDAR) system 104 in accordance with embodiments of the present invention, in an exemplary operating environment, is depicted in FIG. 1. The LIDAR system 104, also referred to herein as a sensor system 104, is mounted to a platform 108. In this example, the platform 108 is an airplane, however, other mobile or even stationary platforms 108 may be associated with the LIDAR system 104. Examples of other mobile platforms 108 include satellites, helicopters, unmanned aerial vehicles, autonomous rovers, balloons, cars, all-terrain vehicles, ships, or other mobile platforms. Examples of stationary platforms 108 include radio towers, power transmission towers, observation towers, telephone poles, or other stationery supports. In general, the platform 108 is used to place the sensor system 104 in a location from which a survey area, target region, or scene 112 is observed. When the sensor system 104 is in a desired position with respect to the scene 112, it is operated to output illumination light 116 and pass the light through a target volume 106 to illuminate a target area or areas 114 within the scene 112. Reflected light 120 is returned from the target area 114 with the scene 112 and is detected by the LIDAR or sensor system 104.

As can be appreciated by one of skill in the art after consideration of the present disclosure, different target areas 114 comprising different elements or features within a scene 112 will reflect the illumination light 116 differently. For example, a terrain feature comprising a forested hillside 128 may reflect the illumination light 116 less efficiently than a lake or pond 148. As a further example, an area within the scene 112 covered by snow will typically reflect the illumination light 116 more efficiently than an area that is not covered by snow.

Accordingly, as an example but without limitation, embodiments of the present disclosure can operate to mitigate backscatter light created by noise in the atmosphere between the Lidar system and the target. In some embodiments, backscatter light may be created by noise further from the Lidar system than the target.

Figure 2A:
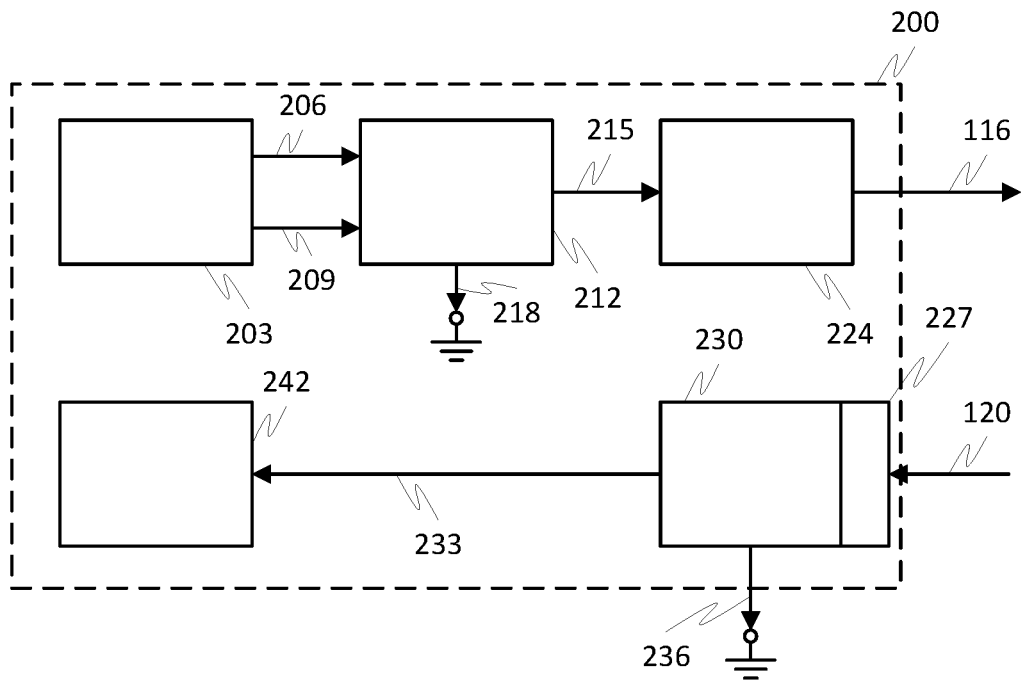
FIG. 2A depicts a Lidar system in accordance with embodiments of the present disclosure.

FIG. 2A illustrates components that may be included in a Lidar system 200 in some embodiments. For example, the Lidar system 200 may comprise a laser emitter 203. The laser emitter 203 may be capable of emitting multiple lasers of multiple wavelengths. For example, a Lidar system 200 may comprise two laser seed diodes. A first laser 206 of a first wavelength may be emitted from the laser emitter 203 and a second laser 209 of a second wavelength may be emitted from the laser emitter 203.

The lasers 206, 209 emitted from the laser emitter 203 may be fed through a wavelength filter switch 212 which may be as described in greater detail below. The wavelength filter switch 212 may be capable of eliminating or otherwise grounding out a first laser 218 of the two input lasers 206, 209 and transmitting a second laser 215 of the two input lasers 206, 209 to an amplifier 224 such as a fiber laser amplifier.

The wavelength filter switch 212 may be capable of quickly switching between outputting a first of the two input lasers 206, 209 and outputting a second of the two input lasers 206, 209. The output laser 215 of the wavelength filter switch may pass through the amplifier 224 and be output of the Lidar system 200 as an emitted beam 116. By switching the output of the wavelength filter switch 212 between the two input lasers 206, 209, the laser 116 output from the Lidar system 200 may switch between wavelengths equivalent to the first and second input lasers 206, 209. In some embodiments, the wavelength filter switch may comprise a dichroic and/or temporal switch. In some embodiments, the wavelength filter switch may comprise a spectral-spatial filter such as a grating that spatially separates or demuxes the incoming signals.

The Lidar system 200 may further comprise a variable waveplate 227, or other filter, capable of detecting incoming light 120. For example, the variable waveplate 227 may receive returning laser light as bounced off of a target a distance away from the variable waveplate 227. The variable waveplate 227 may also receive any backscatter light created by noise in the atmosphere. While a variable waveplate 227 is described herein by way of example, the disclosure should not be considered as limited to such. For example, received signal colors may be separated out using a grating to spatially separate out the colors and to illuminate a different part of the array. Polarization, as performed by a variable waveplate, is only one way to separate out wavelengths and/or colors of light. The systems and methods described in the present disclosure should not be considered as limited to polarization or any other system of filtering wavelengths and/or colors.

Light received by the variable waveplate 227 may be fed into a second wavelength filter switch 230. The second wavelength filter switch 230 may be capable of filtering out light of an expected wavelength, outputting the received light of the expected wavelength 233 to a receiver 242 and eliminating, ignoring, or grounding out any other received light 236.

Figure 2B:
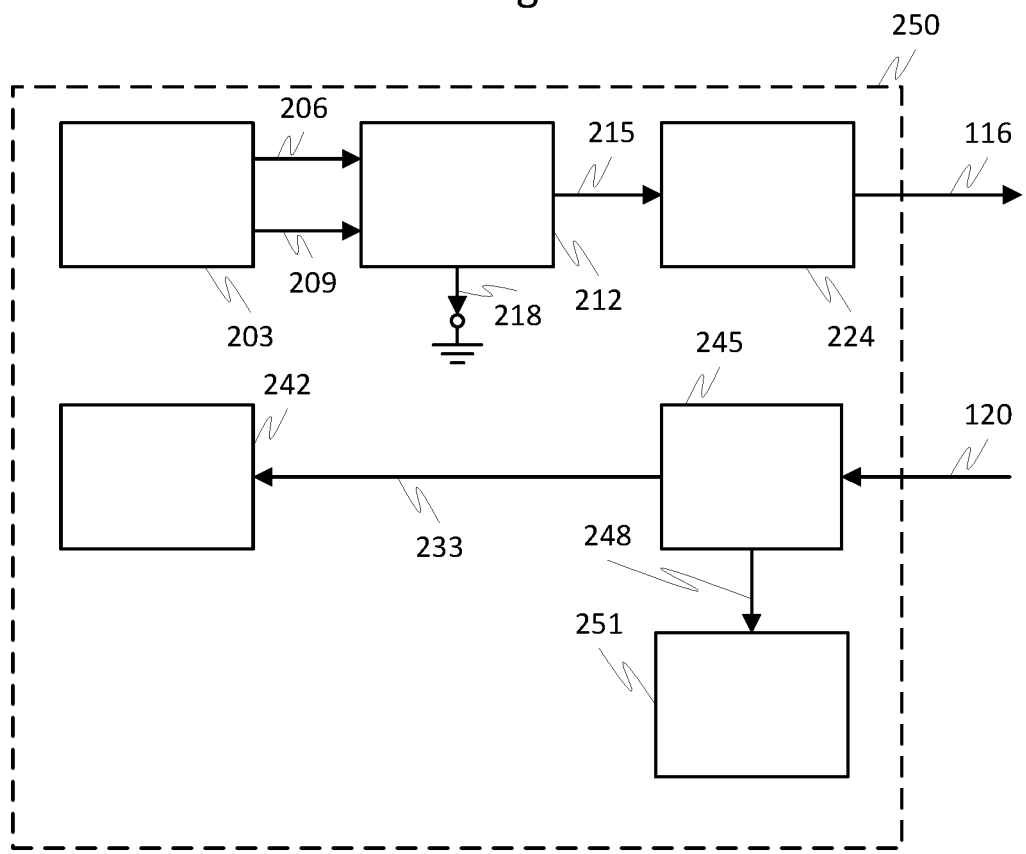
FIG. 2B depicts a Lidar system in accordance with embodiments of the present disclosure.

As illustrated in FIG. 2B, a Lidar system 250 may in some embodiments comprise a spectral-spatial demultiplexer ("demux") element 245 such as a grating or dichroic filter. The spectral-spatial demux element 245 may be capable of splitting the incoming light 120 into a first output laser 233 and a second output laser 248. Each of the first output laser 233 and the second output laser 248 may be received by a different receiver 242, 251. As can be appreciated, the incoming light 120 may be split into one, two, or any number of spectral-spatial signals of various ranges of wavelengths. Using a Lidar system 250 as illustrated in FIG. 2B, both the first output laser 233 and the second output laser 248 may be analyzed together or separately to determine the distance to the target.

Figure 3:
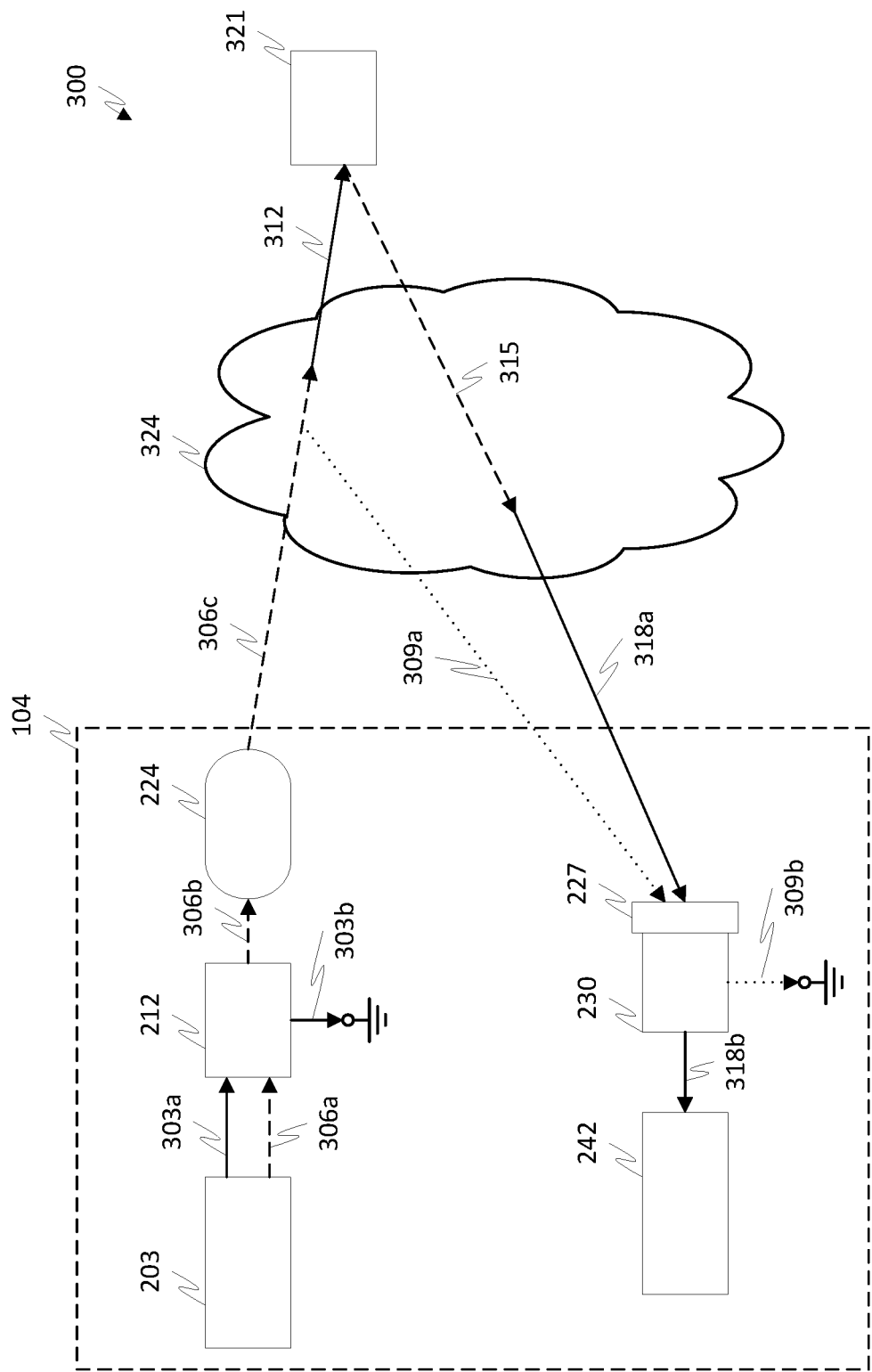
FIG. 3 depicts a Lidar system detecting a position of a target in accordance with embodiments of the present disclosure.

FIG. 3 depicts an environment 300 illustrating a Lidar system 104 in accordance with one or more embodiments as described herein. As previously described, the Lidar system 104 may comprise an emitter 203 emitting two lasers 303a, 306a. Each of the two emitted lasers 303a, 306a may be of a different wavelength. A wavelength filter switch 212 may operate to output one laser 306b of the two emitted lasers 303a, 306a, and to eliminate, ignore, or ground out the other laser 303b of the two emitted lasers 303a, 306b. The wavelength filter switch 212 may switch between outputting a laser 306b with a wavelength equivalent to the first laser 303a and outputting a laser with a wavelength equivalent to the second laser 306a. The laser 306b output by the first wavelength filter switch 212 may be amplified by an amplifier 224 and may be output as an output laser 306c toward a target 321. While the Lidar system 104 described in accordance with FIG. 3 is similar to the Lidar system 200 illustrated in FIG. 2A, it should be appreciated such a system may be executed using a system such as the Lidar system 250 illustrated in FIG. 2B and described herein.

As depicted in FIG. 3, the laser emitted from the Lidar system 104 may be periodically switched between a first wavelength and a second wavelength as illustrated by the dashed and solid lines of 306c, 312, 315, 318a. The depiction in FIG. 3 shows a snapshot in time after which the Lidar system 104 emitted a first laser 318a of a first wavelength, a first laser 315 of a second wavelength, a second laser 312 of the first wavelength, and a second laser 306c of the second wavelength. Thus, at any given time lasers emitted from the Lidar system 104 may be of two different wavelengths between the Lidar system and the target.

As laser light travels from the Lidar system 104 and the target 321, the laser light may travel through air containing a noise source 324. A noise source 324 may reflect a portion 309a of a laser 306c emitted from the Lidar system 104. The portion 309a of the laser 306c may be received by a variable waveplate 227 of the Lidar system 104 in addition to a laser 318a returning from the target 321.

After being received by the variable waveplate 227, the laser 318a returning from the target 321 and the portion 309a reflected by the noise source 324 may enter a second wavelength filter switch 230. The wavelength filter switch 230 may operate to pass an output laser 318b which is equivalent to the laser 318a returning from the target 321 by filtering out the portion 309a reflected by the noise source 324 based on the wavelength of the laser 318a returning from the target 321. The portion 309a reflected by the noise source 324 may be eliminated, ignored, or otherwise grounded out, while the output laser 318b which is equivalent to the laser 318a returning from the target 321 may be received by a receiver sensor 242 of the Lidar system 104.

Figure 4A:
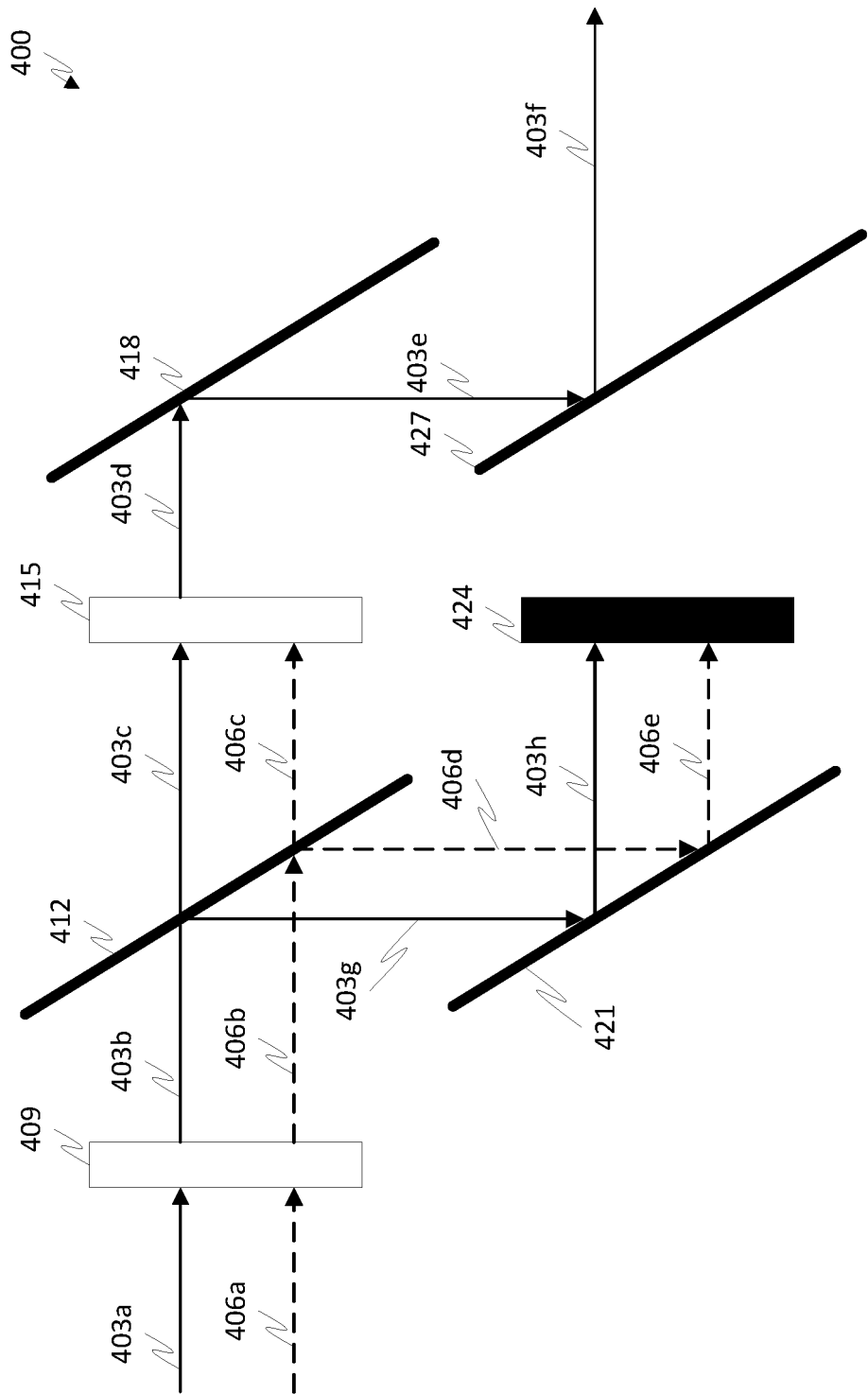
FIG. 4A is a depiction of a switch in accordance with embodiments of the present disclosure.
Figure 4B:
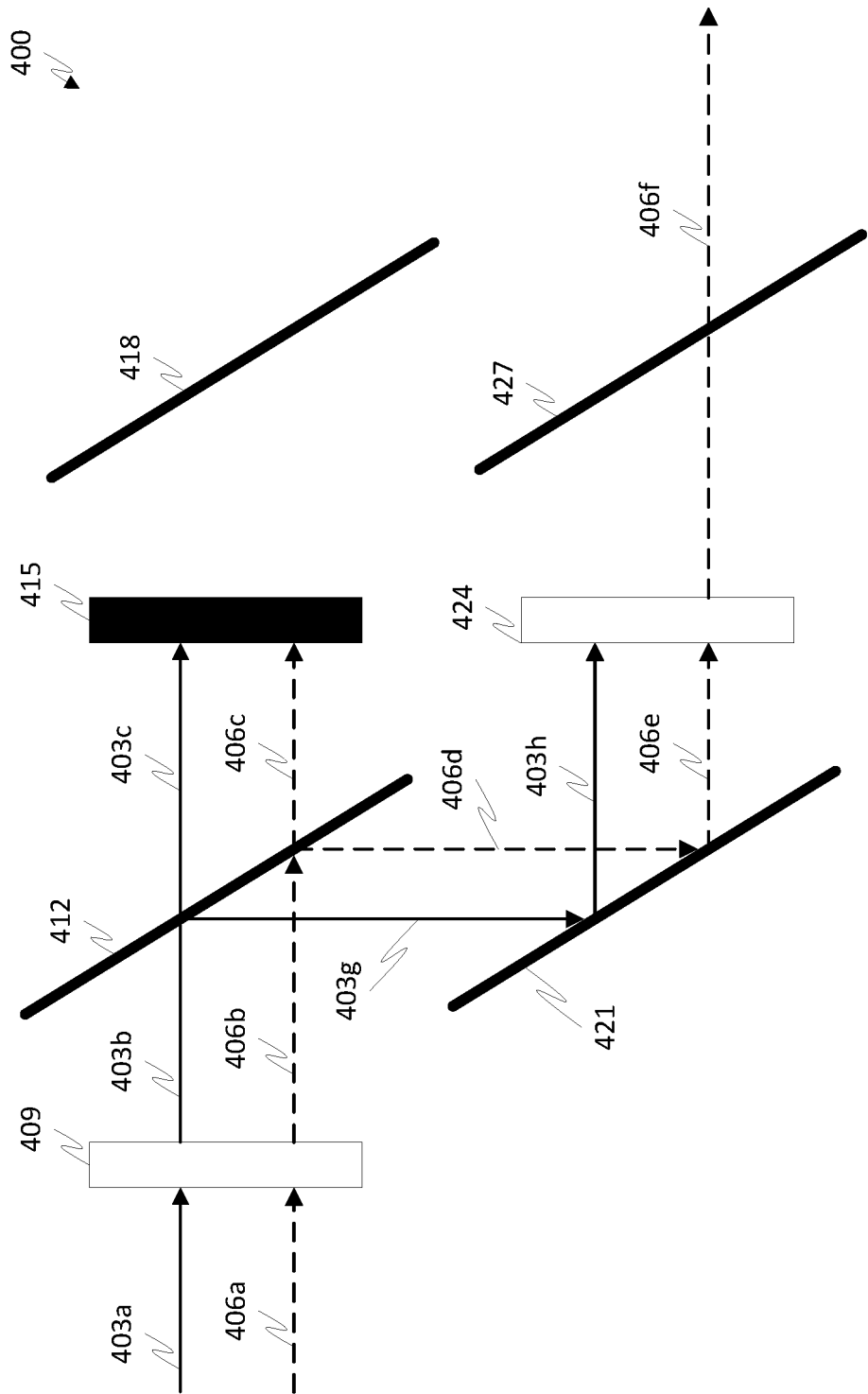
FIG. 4B is a depiction of a switch in accordance with embodiments of the present disclosure.

The wavelength filter switches 212, 230 of the Lidar system 104 may be a dichroic filter switch as depicted in FIGS. 4A and 4B. FIG. 4A depicts a dichroic filter switch 400 in a first state emitting a laser 403f with a first wavelength matching a wavelength of a first input laser 403a and FIG. 4B depicts the dichroic filter switch 400 in a second state emitting a laser 406f with a second wavelength matching a wavelength of a second input laser 406a. The dichroic filter switch 400 may comprise four polarizing beam splitters 412, 418, 421, 427 or other reflective surfaces which both allow lasers to pass through and reflect off at an angle. The dichroic filter switch 400 may also comprise a variable wave plate 409 and two or more narrow band-pass filters 415, 424.

The variable wave plate 409 may be capable of receiving two or more lasers 403a, 406a. The received lasers 403a, 406a may be of different wavelengths. For example, a first laser 403a received by the variable wave plate 409 may be of a first wavelength and a second laser 406a received by the variable wave plate 409 may be of a second wavelength. The two lasers 403a, 406a may be received by the variable wave plate 409 simultaneously. The variable wave plate 409 may pass the two received lasers 403a, 406a out as two output lasers 403b, 406b. For example, the first input laser 403a may be output as a first internal laser 403b where the first input laser 403a has a same wavelength as the first internal laser 403b, while the second input laser 406a may be output as a second internal laser 406b where the second input laser 406a has a same wavelength as the second internal laser 406b.

Upon the internal lasers 403b, 406b reaching a first polarizing beam splitter 412 the internal lasers 403b, 406b may be split. For example, 403b may be split into a first beam 403c traveling through the first polarizing beam splitter 412 and in the same general direction as the first internal laser 403b and a second beam 403g traveling at a ninety-degree angle from the first internal laser 403b. Similarly, the second internal laser 406b may be split into a first beam 406c traveling through the first polarizing beam splitter 412 and in the same general direction as the second internal laser 406b and a second beam 406d traveling at a ninety degree angle from the second internal laser 406b.

For the two beams 403c, 406c traveling through the first polarizing beam splitter 412, the beams 403c, 406c may be filtered using a first narrow bandpass filter 415.

As seen in FIGS. 4A and 4B, each narrow bandpass filter 415, 424 may be turned off and on such that the switch 400 may operate in two states. In a first state as illustrated in FIG. 4A, a first output beam 403f of a same wavelength as a first input beam 403a of the two input beams 403a, 406a may be outputted while in a second state as illustrated in FIG. 4B, a second output beam 406f of a same wavelength as a second input beam 406a of the two input beams 403a, 406a may be outputted.

In the first state as illustrated in FIG. 4A, the filter 415 may be turned on such that a first beam 403c of the two beams 403c, 406c passes through the filter 415 as beam 403d while a second beam 406c of the two beams 403c, 406c ends at the filter 415. The beam 403d may then reflect as a beam 403e off a second polarizing beam splitter 418 and reflect as a beam 403f off a third polarizing beam splitter 427 before being output as a first output beam 403f.

For the beams 403g, 406d reflected off the first polarizing beam splitter 412, each may be reflected off another polarizing beam splitter 421 as beams 403h, 406e. In the first state as illustrated in FIG. 4A, a second narrow bandpass filter 424 may be turned off such that both beams 403h, 406e end at the filter 424 and none pass through.

In the second state as illustrated in FIG. 4B, the first filter 415 may be turned off such that beams 403c, 406c hitting the filter 415 end and the second filter 424 may be turned on such that the beam 403h of the first wavelength ends at the second filter 424 while the beam 406e of the second wavelength pass through the second filter 424 as beam 406f. The beam 406f may pass straight through the third polarizing beam splitter 427 and be output of the switch 400.

Figure 5:
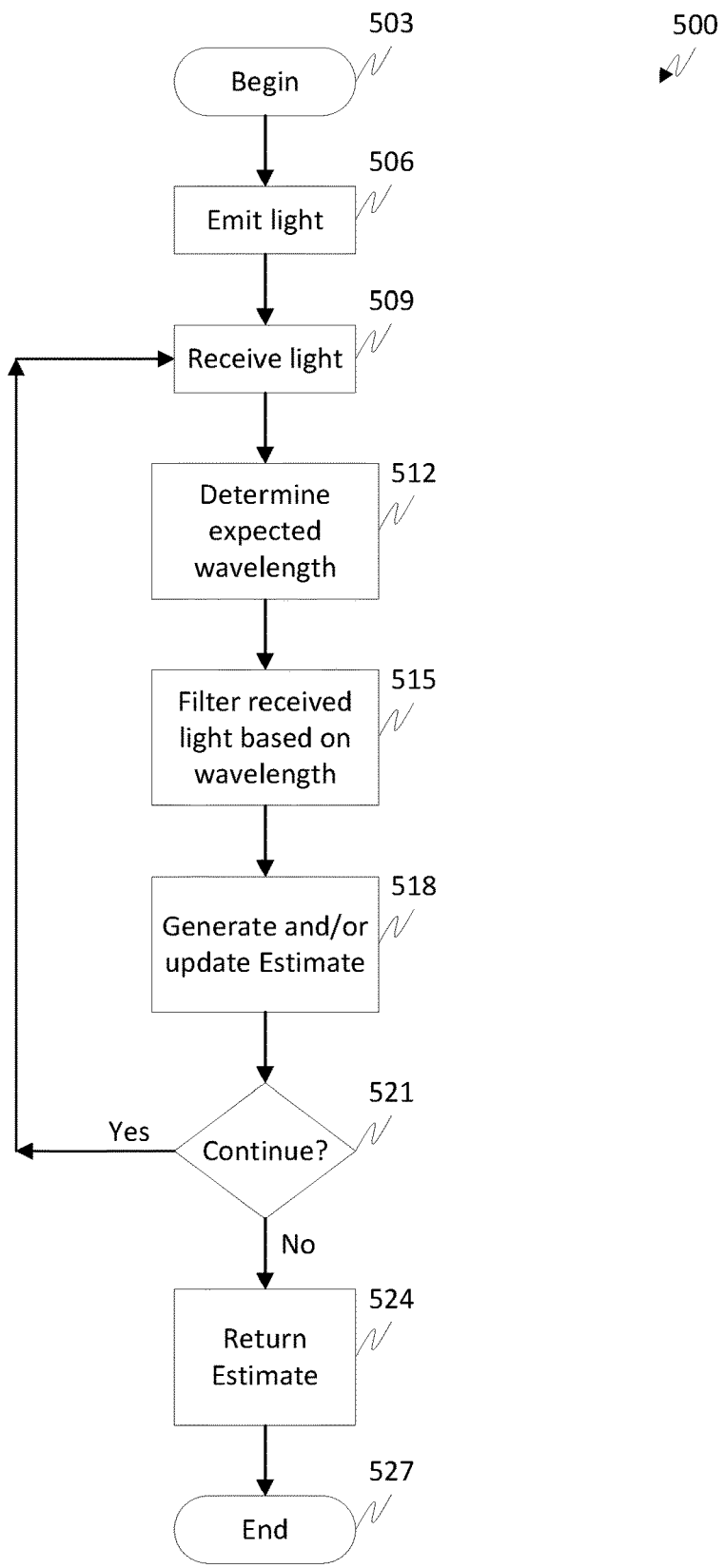
FIG. 5 is a flowchart of a method in accordance with embodiments of the present disclosure.

As illustrated by the flowchart in FIG. 5, a method 500 may be performed using a Lidar system as described herein. At the start 503 of the method 500, a user seeking to determine qualities of a target some distance away may have a Lidar system as described above. The user may or may not have an estimated distance between the target and the Lidar system. For example, the user may use the Lidar system to determine a rough estimate of the distance of the target.

In a first step 506 of the method 500, the Lidar system may begin to emit a series of pulses of lasers toward the target. For example, the Lidar system may comprise two laser seed diodes and may constantly generate two lasers, where each laser is of a different wavelength. For example, in some embodiments, the wavelength of a first laser may be in a range of 1540-1550 nm and the wavelength of a second laser may be in a range of 1560-1570 nm. In some embodiments, the wavelengths of the first and second lasers may be different by a factor of 20 nm. A dichroic filter switch as described above may be used to switch between emitting each of the two lasers. However, in some embodiments a different type of wavelength switch may be used. A computer system may be used to control the wavelength filter switch. The lasers may each be pulsed for a specific period of time. The period of time each laser is pulsed may be a specific amount and may be determined based on each laser's wavelength, an estimated distance to the target, and/or other factors. For example, each laser may be pulsed between 1 and 50 ns. In some embodiments, a laser of one wavelength may be pulsed multiple times in a row before a laser of a second wavelength may be pulsed. In some embodiments there may be a period of rest between each set of pulses where no laser is emitted.

As the Lidar system emits the laser lights toward the target in succession, the Lidar system may then begin receiving light from the lasers as reflected off the target in step 509. The light received may include some noise. For example, before a laser hits the target, portions of the light of the laser may reflect off a noise source in the air. These portions may also be received by the Lidar system. Because the Lidar system emits successions of lasers of different wavelengths, the light received due to noise may be of a wavelength different from the light being received directly from the target.

In step 512, the Lidar system may determine an expected incoming light wavelength. For example, for each laser pulse emitted by the Lidar system, the Lidar system may estimate a time range for the laser pulse to be received by the Lidar system after reaching and returning from the target. This determination may be made based on the wavelength, the speed of light, and/or the distance to the target. This determination may be calculated by a processor of a computer system of or in communication with the Lidar system.

In step 515, a wavelength filter switch of the Lidar system may be used to filter out only received light of the expected wavelength and ignore or otherwise ground out any received light of an unexpected wavelength.

In step 518, the computer system of or in communication with the Lidar system may be used to generate and/or update an estimate of the distance to the target based on the filtered light received.

At step 521, the method 500 may either continue by returning to step 509 and receiving newly incoming light or may end by proceeding to step 524 and returning the most recently updated estimate of the distance to the target before ending in step 527. If the method 500 is continuing, any updated estimate of the distance to the target may be used to finetune the periods of time each laser is emitted from the Lidar system.

In some embodiments, a secondary, or backscatter, channel may be used to monitor positioning and pointing of a beam. Such a channel may provide advanced beam pointing knowledge as compared to contemporary systems. Scattering of a near-field laser line may have a measurable or identifiable centroid. The centroid of the near-field laser line scattering collected by a secondary or backscatter channel may be monitored to enable laser pointing calibration and/or monitoring.

When a Lidar system is moved, a corresponding shift in a centroid of a near-field laser line scattering collected by a secondary or backscatter channel of the Lidar system may be detected. For example, if a Lidar system is moved by 20 microrads, a corresponding shift in a centroid of a near-field laser line scattering collected by a secondary or backscatter channel of the Lidar system may be detected. In some embodiments, the corresponding shift in the centroid may be in a one-to-one relation with the movement of the Lidar system. In some embodiments, a corresponding shift in the centroid may be in another type of relation with the movement of the Lidar system.

Such a laser pointing monitoring system may be used to verify the accuracy of movement controls for a Lidar system or may be used to replace or augment an auto-alignment system. By using a secondary, or backscatter, channel to monitor positioning and pointing of a beam, size, weight, power consumption, cost, and/or complexity of a Lidar system may be reduced.

In some embodiments, a secondary or backscatter channel may be used to monitor alternative volume from a primary channel. While a Lidar system may be focused on a primary volume at a certain distance, a secondary channel may be used to monitor other volumes for scattering. Using a secondary channel to monitor alternative volumes from a primary channel may be useful in estimating atmospheric conditions relative to primary scatter volume. Estimating atmospheric conditions relative to primary scatter volume may provide useful information in regard to environmental conditions such as estimate transmission which may affect data acquired at a primary volume. Monitoring alternative volume with a secondary or backscatter channel may be used in some embodiments to map atmospheric or other types of scattering conditions.

In some embodiments, wavelength toggling may be used to avoid transient effects in lasers. One of the limiting factors in laser design is the non-steady state or transient behavior of lasers. Using conventional laser design, many laser design specifications (e.g., power, pointing stability, etc.) may be met only when the laser has achieved steady state thermal conditions. Achieving steady state thermal conditions using a conventional laser system may take an excessive amount of time, such as multiple minutes. Many systems, however, require "photons on demand" and thus cannot wait for the laser to reach a steady state. Instead, the laser may be pulsed on and off without reaching steady state thermal conditions. Such laser systems may suffer from poor power efficiency, pointing stability, and other consequences of failing to operate in a steady state thermal condition.

As disclosed herein, in some embodiments, a laser may constantly output light and thus reach and maintain steady state thermal conditions. A light blocker such as a beam dump may be used to optically switch light from the laser from a blocked condition to an emit condition.

Mechanical systems are capable of handling high laser power and handling switching from a blocked condition to an emit condition. Mechanical systems, however, suffer from slow speeds and low reliability due to moving parts. Slow switching speeds of mechanical systems may also provide additional safety concerns such as emitting unwanted protons.

Non-mechanical beam steering can be fast with a high reliability. Non-mechanical beam steering, however, is often limited to relatively low average and peak power.

Wavelength toggling provides for a passive approach, whereas a designated color can be permanently steered off into a beam dump by a dichroic or bandpass filter while other colors are passed and emitted out of the system. Wavelength may be decided at lower power seed and selected on a per pulse basis making switching relatively fast. In this way, the system may operate full time at a high average and high peak power. Using such wavelength toggling provides improved performance for any system which requires steady state thermal conditions. Also, by using such a system, size, weight, power consumption, cost, and/or complexity of a Lidar system may be reduced.

In some embodiments, interference between a plurality of Lidar systems may be reduced by operating each Lidar system at different wavelengths. As the systems and methods disclosed herein provide for the possibility of each Lidar system to operate at multiple wavelengths, the ability to isolate signals from each system relative to other systems may be improved. In this way, each system may be more robust as it will be less susceptible to damage or false returns as compared to contemporary solutions.

Figure 6:
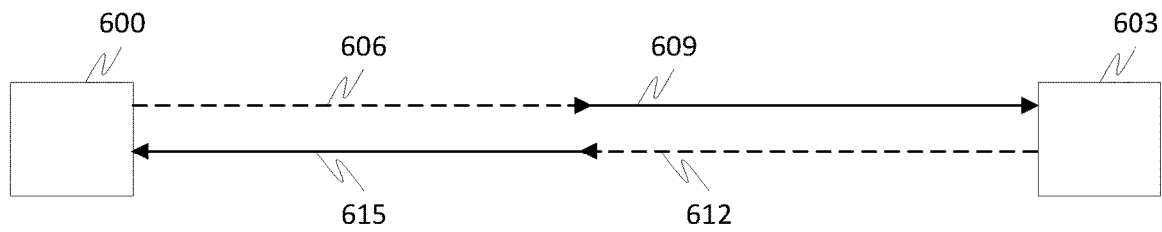
FIG. 6 is an illustration of a communication system in accordance with one or more embodiments of the present disclosure.

The disclosed systems and methods of wavelength toggling may be used to enable optical communication using one or more optical communication systems. For example, as illustrated in FIG. 6, a first communication system 600 may be enabled to communicate with a second communication system 603 by sending signals 606, 609 to the second communication system 603 and receiving signals 612, 615 from the second communication system 603. As described herein, signals 606, 609, 612, 615, may each be of a different wavelength. In some embodiments, the communication system 600 may comprise a transceiver device capable of switching between emitting a signal 606 of a first wavelength and a signal 609 of a second wavelength.

Each signal 606, 609, 612, 615 may comprise an encoded signal comprising data such as a data stream or message to be sent between the first and second communication systems 600, 603. By wavelength toggling a in two-way communication system, as described herein, background noise may be reduced. By reducing the background noise, a higher signal-to-noise ratio may be achieved. A higher signal-to-noise ratio allows for either lower system size, weight, power, and/or cost, and/or provides for higher data rates.

Furthermore, the bandwidth of a system that is both transmitting and receiving data simultaneously such as the communication systems 600, 603 of FIG. 6, may be increased. In this way, wavelength toggling may provide for another form of code encoding that can be used to synchronize a transceiver or to send additional data between an emitter and a receiver.

Wavelength switching at known or measurable frequencies between two or more communication transceivers allows for each of the communication transceivers to be synchronized and to receive data at one wavelength while transmitting at a different wavelength. By enabling transceivers to communicate while toggling between signals of different wavelengths, each transceiver can also be used to monitor a position and/or a velocity of another transceiver while transmitting, which can be used for multiple system optimization parameters.

Using wavelength toggling as described herein enables a communication system to be used to monitor position of the transceiver while transmitting data, improving pointing capabilities of the communication system during the transmission of data.

Figure 7A:
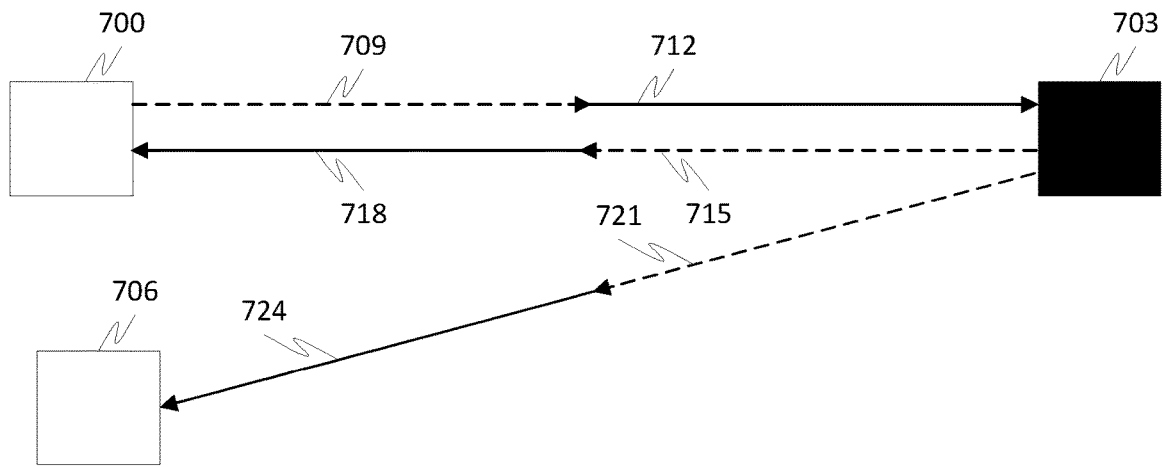
FIGS. 7A and 7B are illustrations of communication systems in accordance with one or more embodiments of the present disclosure.

In some embodiments, wavelength toggling as described herein may be used to synchronize or increase bandwidth or communication rates between transceivers, or a transceiver and separate receiver, during bistatic single or simultaneous communication. For example, as illustrated in FIG. 7A, a transceiver 700 can be synchronized with a device comprising a receiver 706. The transceiver 700 may be configured to emit signals 709, 712, using wavelength toggling as described herein, in a series towards a target 703. The signals 709, 712 emitted toward the target 703 may be reflected off the target 703 as signals 715, 718 which may be received by the transceiver 700 and as signals 721, 724 may be received by the receiver 706. The timing of the receipt of the signals 715, 718 by the transceiver 700 and of the signals 721, 724 by the receiver 706 may be used to synchronize the receiver as well as to send data from the transceiver 700 to the receiver 706.

In this way, using wavelength toggling, two transceivers may be synchronized together whether the signals are transmitted directly between the two transceivers or whether the signals are reflected or bounced off another object as illustrated in FIG. 7A.

Figure 7B:
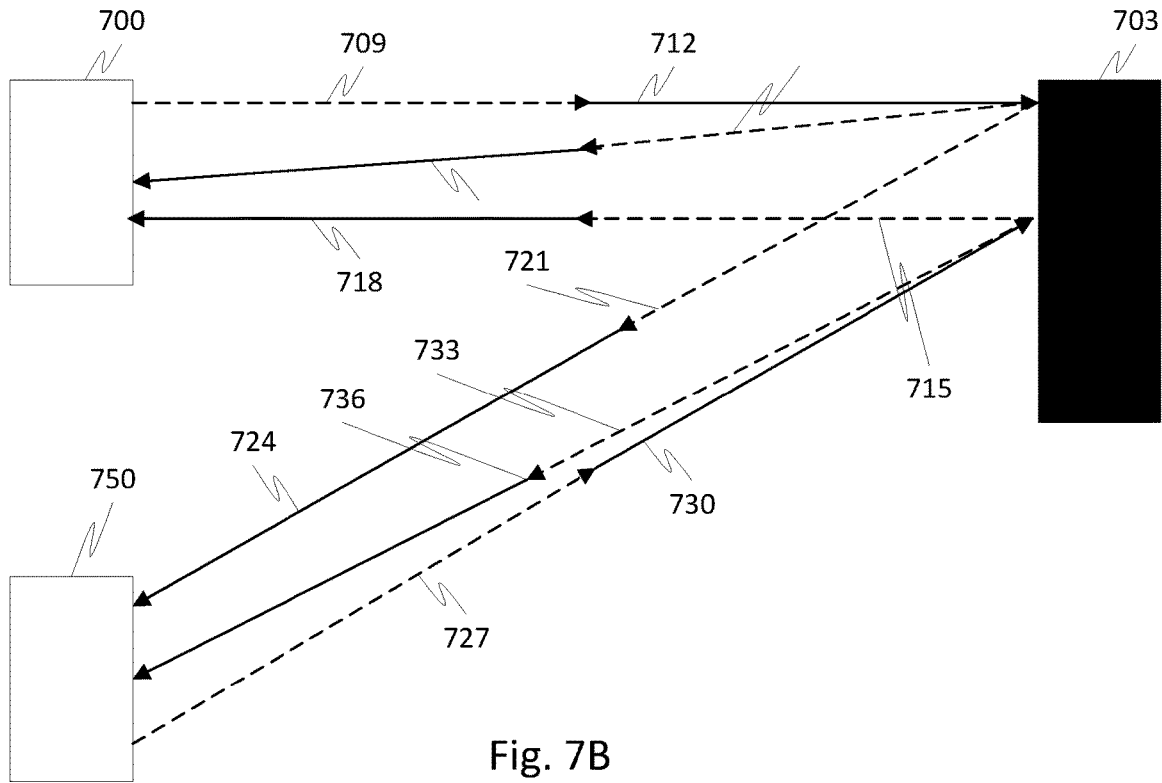

As illustrated in FIG. 7B, a first transceiver 700 can synchronize with a second transceiver 750 while sending data to and receiving data from the second transceiver 750. Each of the transceivers 700, 750 can transmit data and receive data simultaneously. The signals emitted by each transceiver 700, 750 can be reflected off an object, such as a designated target, and received by the emitted transceiver and the other transceiver. Such signals may be used both for monitoring location of the object or target as well as for synchronizing the transceivers 700, 750.

Wavelength toggling as described herein may be used in some embodiments to encode and/or process and code sent by a communication system. As described herein, wavelength toggling can be used to provide another form of code encoding that can be used to synchronize up transceiver or send additional data.

Temporal codes are conventionally used in Lidar and communication systems to either convey information, improve the signal-to-noise ratio, solve range and/or time ambiguity and/or to prevent spoofing. Such temporal codes may conventionally be either a wavelength code or an amplitude pulse code but not both. An example of wavelength code is chirping. Examples of pulse codes include pseudo random noise, Golub, prime delay codes, etc.

Wavelength toggling while transmitting codes between an emitter and a receiver allows us to use both wavelength coding and amplitude or pulse coding together to expand the available number and kinds of codes.

Figures 8A, 8B:
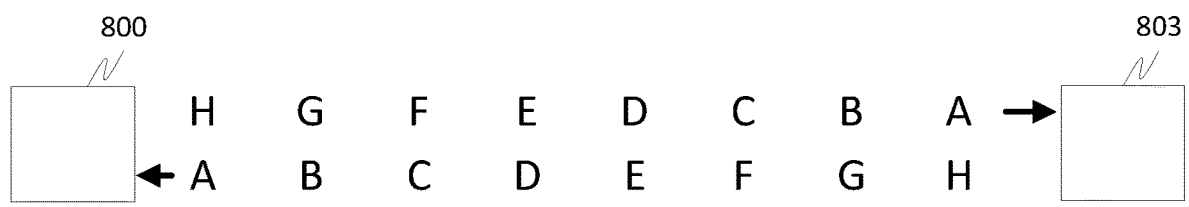
FIG. 8A is an illustration of a communication system in accordance with one or more embodiments of the present disclosure.
FIG. 8B is an illustration of processing complexity in accordance with one or more embodiments of the present disclosure.

As illustrated in FIG. 8A, consider a traditional pulse code of 'ABCDEFGH' sent from a first transceiver 800 at a target 803. The target 803 may be, for example, another transceiver or any type of object. A reflected signal of ABCDEFGH is received by the first transceiver 800 from the target 803 in response. The processing complexity, as illustrated by the table 806 in FIG. 8B, includes a pairing of each of transmitted A, B, C, D, E, F, G, H with each of the received A, B, C, D, E, F, G, H. This complexity is represented by the eight-by-eight table of FIG. 8B and includes $8^2=64$ entries.

Figures 9A, 9B:
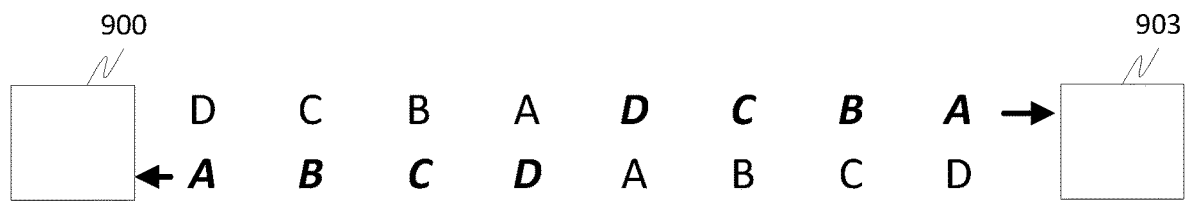
FIG. 9A is an illustration of a communication system in accordance with one or more embodiments of the present disclosure.
FIG. 9B is an illustration of processing complexity in accordance with one or more embodiments of the present disclosure.

As illustrated in FIG. 9A, by using wavelength toggling, a code may be sent by a transceiver 900 in both a spectral and a temporal code to another transceiver or other object 903. A first pulse of ABCD, represented in bold italic font, may be sent in a first wavelength to a target followed by a second pulse of ABCD, represented in non-bold non-italic font, in a second wavelength. In response, the first pulse of ABCD at the first wavelength as sent by the transceiver 900 to the target 903 may be reflected back toward the transceiver 900 followed by the second pulse of ABCD in the second wavelength.

The processing complexity of the system of FIG. 9A is reduced as compared to the system of FIG. 8A as illustrated by FIG. 9B. The eight-by-eight table 806 of FIG. 8B is larger than the reduced size of the two four-by-four tables 906, 909 as illustrated in FIG. 9B. The eight-by-eight table 806 of FIG. 8B includes 64 entries ($8^2$) while the two four-by-four tables 906, 909 of FIG. 9B include a total of 32 entries ($2 \times 4^2$).

Using such a system, fewer temporal codes may be required as each can be repeated at a different wavelength. This allows for separation of processing paths and a reduction of potential sideband contributions. As should be appreciated, wavelength toggling can be used to simplify the processing complexity of a communication system by a factor of the number of wavelengths.

The independent wavelength decorrelation processing of pulse codes increases the sparsity in each domain while allowing for additional noise suppression and signal detection techniques.

While two different wavelengths are illustrated and described, it should be appreciated that any number of wavelengths and codes can be used. It should also be appreciated that in some embodiments the number of practical orthogonal/unique (non-overlapping) codes can be limited in an operational system due to constraints like laser energy build up time and camera reset/after pulsing.

In some embodiments, wavelength toggling can be used to monitor separate multiple range gates or angular gates.

Because, by using the systems and methods described herein, a transmitted signal or beam may be encoded in both time and wavelength, the signal can be used to probe and/or monitor various range gates more efficiently as compared to conventional systems and to improve the local signal-to-noise ration in each range gate.

Figure 10A:
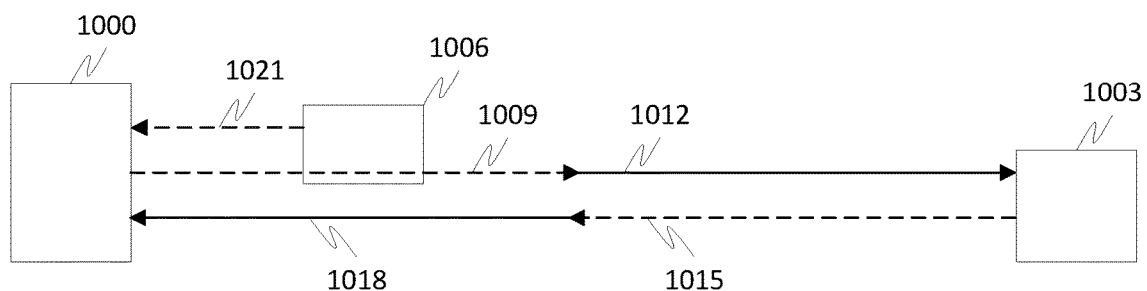
FIG. 10A is an illustration of a communication system in accordance with one or more embodiments of the present disclosure.

As illustrated in FIG. 10A, signals 1009, 1012 transmitted from a transceiver 1000 may be emitted at a target 1003 in a series of wavelengths using wavelength toggling as described herein. The signals 1009, 1012 may reflect off the target 1003 and back to the transceiver 1000 as signals 1015, 1018. The signals 1009, 1012 may, while traveling towards the target 1003, pass through a first object 1006 which may cause a near-field or backscatter channel 1009 to reflect back towards the transceiver 1000 from the object 1006.

The near-field or backscatter channel 1021 may contain information which may be useful for a variety of applications. For example, a near-field or backscatter channel may be useful for one or more of detection and tracking of targets at a relatively closer range will rise above the noise floor; monitoring environmental situations, such as atmospheric conditions, visibility, underwater turbidity, etc.; monitoring system parameters such optical window backscattering levels, boundary layer measurements, window affects, etc.; and improving a signal-to-noise ratio which may allow for either a lower system size, weight, power consumption, etc., or for higher data rates.

Figure 10B:
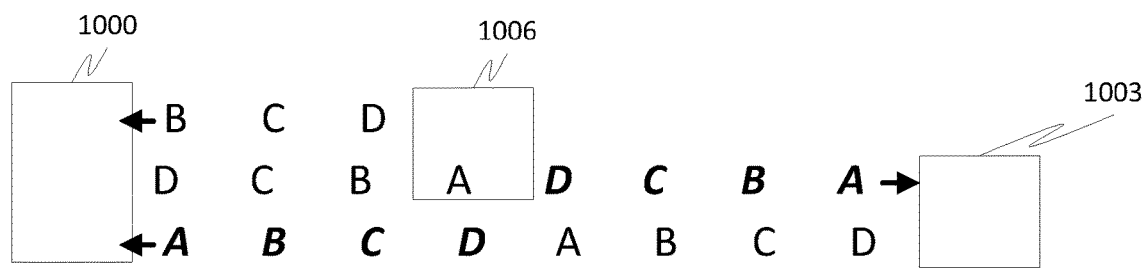
FIG. 10B is an illustration of processing complexity in accordance with one or more embodiments of the present disclosure.

As illustrated in FIG. 10B, the signals sent from the transceiver 1000 towards the target 1003 may be in the form of spectral and/or temporal codes. Using a wavelength toggling system as described herein, multiple wavelength and temporal codes can be used to encode an angular space and to provide additional angular resolution about a target scene which can be used for a variety of system improvements such as centroiding or active divergence control. The backscatter channel of spectral and/or temporal code may enable a transceiver 1000 to gather information regarding an object 1006 between the transceiver 1000 and the target 1003.

Figure 11A:
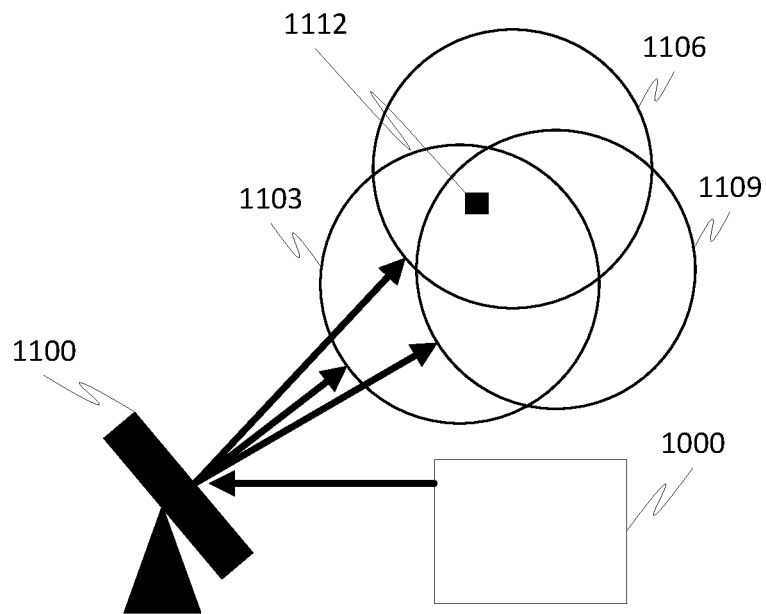

As illustrated in FIG. 11A, information relating to a target 1112 within range of a transceiver 1000 may be collected using one or more fast steering mirror systems ("FSMs") 1100. The FSM may modulate at, for example, around 3 kHz in some embodiments. Using wavelength toggling with a transceiver 1000 as described herein transmitting a plurality of signals 1103, 1106, 1109, at varying wavelengths, a target 1112 can be monitored and/or tracked at different range gates using a single detector (e.g., multiple transmitters that are simply separated by spectrum on the detector) or a plurality of transceivers with different ranges.

Figure 11B:
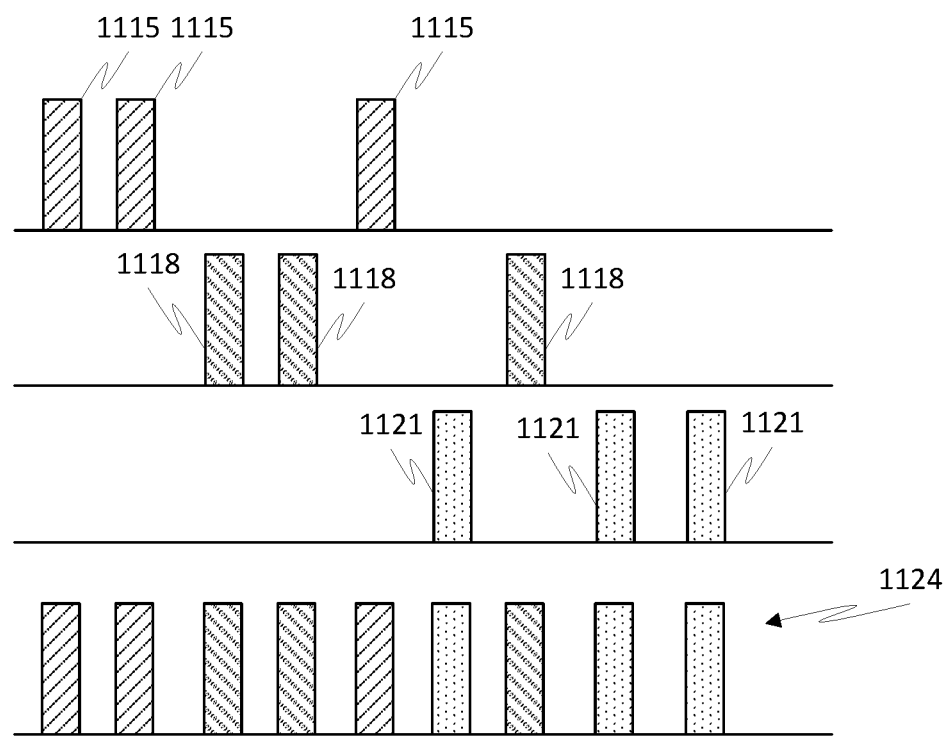

As an example, a transceiver 1000 may send a first signal 1103 to a first location. Each of the signals 1103, 1106, 1109 may be distinct beamlet codes that are spatially encoded to a particular angle. Each of the signals 1103, 1106, 1109 may comprise a respective temporal code, e.g., pseudorandom noise ("PRN") code. The first temporal code may be a series of pulses 1115 as illustrated in FIG. 11B, the second temporal code may be a different series of pulses 1118, and the third temporal code may be a different series of pulses 1121. At, for example, a 100 kHz pulse repetition frequency ("PRF"), 100 shot blocks may provide a 1 kHz update. In some embodiments, each signal 1103, 1106, 1109 may be transmitted as a series of shots, for example 33 shots, 100 shots, etc. Such numbers are provided as an example, and it should be appreciated the same or a similar system may be at other rates. The pulses 1115, 1118, 1121 may be transmitted in a single series of pulses 1124 as illustrated in FIG. 11B.

Figure 11C:
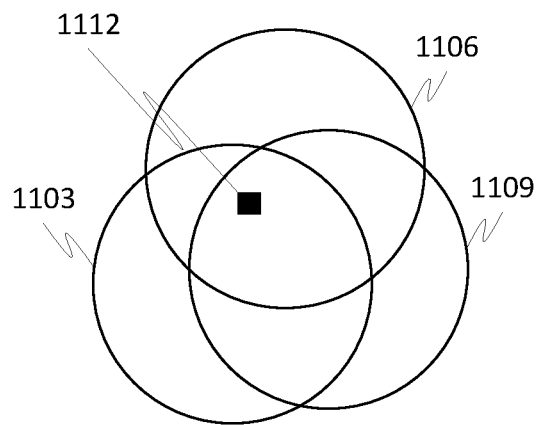
Figure 11D:
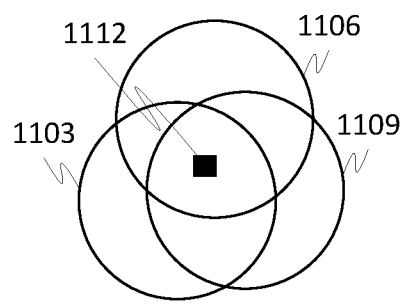

A target detection algorithm may be used to integrate pulses of each signal for initial target detection. By transmitting a different one of three temporal codes to a different location, a position of a target 1112 may be determined. As illustrated in FIG. 11C, the three signals 1103, 1106, 1109 are each transmitted to a different area near the target 1112. Each of the three signals 1103, 1106, 1109 may comprise a different temporal code. A transceiver may transmit the signals 1103, 1106, 1109 and receive reflected signals in response. Based on the response, one or more of a focus point and an angle for each of the signals 1103, 1106, 1109 may be adjusted. As illustrated in FIG. 11D, the three signals 1103, 1106, 1009 are more focused and better centered on the target 1112 as compared to FIG. 11C. Using a target detection algorithm as described herein, a target can be driven to a better centroid. Using faster closed loop knowledge, an improvement in jitter rejection may be achieved and better pointing of signals may enable tighter beam divergence. In some embodiments, signals 1103, 1106, 1109 may first be angularly centered on the target before being focused to a narrower point. In some embodiments, a repeated process of adjusting angular position and focus of each signal 1103, 1106, 1109 may be performed to center and focus each signal 1103, 1106, 1109 on the target 1112.

After focusing the signals 1103, 1106, 1109 on the target 1112, as illustrated in FIG. 11D, a data collection algorithm may be used to collect information about the target.

While the examples provided in relation to FIGS. 11A-11D describe the use of three temporal codes, in some embodiments four or more codes may be used. It should be appreciated that a minimum of three points may be required to generate a centroid and four points may be used to generate a quadrature cell format. For example, as illustrated in FIG. 11E, four signals 1103, 1106, 1109, 1127 may be used to gather information relating to a single target 1112. In some embodiments, a sensor with four detectors may be used to determine a centroid of return. In some embodiments, a rectilinear detector may be used.

As illustrated in FIG. 11F, five signals 1103, 1106, 1109, 1127, 1130 may be used to gather information relating to a single target.

While the examples provided in relation to FIGS. 11A-11F illustrate the signals as distributed in a symmetric energy distribution, it should be appreciated that in some embodiments, other distributions of signals may be used. For example, targets of different shapes may call for different distributions of signals. In some embodiments, after collecting data about a shape of a target, the distribution of the signals may be adjusted to account for the shape. For example, as illustrated in FIG. 11G, information relating to an oblong target 1112 may be obtained by transmitting signals 1103, 1106, 1109 centered to a left edge of the target 1112, a center of the target 1112, and a right edge of the target 1112, respectively. In some embodiments, signals 1103, 1106, 1109, 1127, 1130 may be transmitted toward a target 1112 as illustrated in FIG. 11H. It is possible for a signal 1130 to miss the target in such a way as that no power from the signal 1130 reaches the target. Such information may be useful in a target detection algorithm as described above.

Embodiments of the present disclosure include a method of mitigating backscatter noise in a Lidar system, the method comprising: transmitting a first signal of a first wavelength from a laser emitter; receiving, at a variable waveplate or other filter, the first signal; filtering, with a first wavelength filter switch, the first signal received by the variable waveplate or other filter; receiving the filtered first signal with a receiver sensor; transmitting a second signal of a second wavelength from the laser emitter; receiving the second signal with the variable waveplate or other filter; filtering the second signal with the first wavelength filter switch; receiving the filtered second signal with the receiver sensor; and based on the received filtered first and second signals, determining a distance of a target.

Aspects of the above method include wherein the first and second signals are transmitted from the laser emitter through a second wavelength filter switch.

Aspects of the above method include wherein the first and second signals are transmitted through a fiber laser amplifier, wherein the first and second signals comprise high-power fiber lasers.

Aspects of the above method include the method further comprising estimating the distance of the target prior to transmitting the first signal.

Aspects of the above method include wherein the first and second signals are transmitted for a first and second period of time, respectively, based on the estimated distance.

Aspects of the above method include wherein filtering the first signal comprises: receiving a backscattered signal of a third wavelength, wherein the third wavelength differs from the first wavelength; and using the first wavelength filter switch to filter out the backscattered signal.

Aspects of the above method include wherein the third wavelength is the same as or similar to the second wavelength.

Aspects of the above method include wherein the first and second signals are generated simultaneously, and a second wavelength filter switch is used to transmit each signal individually.

Aspects of the above method include wherein the first wavelength switch is a dichroic filter switch.

Aspects of the above method include wherein the first wavelength switch is a spectral spatial filter switch.

Embodiments of the present disclosure include a Lidar system, the Lidar system comprising: a laser emitter transmitting a first signal of a first wavelength; a variable waveplate or other filter receiving the first signal; a first wavelength filter switch filtering the first signal received by the variable waveplate or other filter; a receiver sensor receiving the filtered first signal; the laser emitter transmitting a second signal of a second wavelength; the variable waveplate or other filter receiving the second signal; the first wavelength filter switch filtering the second signal; the receiver sensor receiving the filtered second signal; and a processor determining a distance of a target based on the received filtered first and second signals.

Aspects of the above Lidar system include wherein the first and second signals are transmitted from the laser emitter through a second wavelength filter switch.

Aspects of the above Lidar system include wherein the first and second signals are transmitted through a fiber laser amplifier, wherein the first and second signals comprise high-power fiber lasers.

Aspects of the above Lidar system include the Lidar system further comprising estimating the distance of the target prior to transmitting the first signal.

Aspects of the above Lidar system include wherein the first and second signals are transmitted for a first and second period of time, respectively, based on the estimated distance.

Aspects of the above Lidar system include wherein filtering the first signal comprises: receiving a backscattered signal of a third wavelength, wherein the third wavelength differs from the first wavelength; and using the first wavelength filter switch to filter out the backscattered signal.

Aspects of the above Lidar system include wherein the third wavelength is the same as or similar to the second wavelength.

Aspects of the above Lidar system include wherein the first and second signals are generated simultaneously, and a second wavelength filter switch is used to transmit each signal individually.

Aspects of the above Lidar system include wherein the first wavelength switch is a dichroic filter switch.

Aspects of the above Lidar system include wherein the first wavelength switch is a spectral spatial filter switch.

Embodiments of the present disclosure include a method of sending data, the method comprising: transmitting a first code of a first wavelength from a laser emitter; receiving, at a variable waveplate or other filter, the first code; filtering, with a first wavelength filter switch, the first code received by the variable waveplate or other filter; receiving the filtered first code with a receiver sensor; transmitting a second code of a second wavelength from the laser emitter; receiving the second code with the variable waveplate or other filter; filtering the second code with the first wavelength filter switch; receiving the filtered second code with the receiver sensor; and based on the received filtered first and second codes, synchronizing the laser emitter.

Aspects of the above method include wherein the first and second codes are transmitted from the laser emitter through a second wavelength filter switch.

Aspects of the above method include wherein the first and second codes are transmitted through a laser amplifier, wherein the first and second codes comprise high-power laser beams.

Aspects of the above method include the method further comprising tracking a position of a target based on the received filtered first and second codes.

Aspects of the above method include wherein filtering the first code comprises: receiving a backscattered code of a third wavelength, wherein the third wavelength differs from the first wavelength; and using the first wavelength filter switch to filter out the backscattered code.

Aspects of the above method include wherein the third wavelength is the same as or similar to the second wavelength.

Aspects of the above method include wherein the first and second codes are generated simultaneously, and a second wavelength filter switch is used to transmit each code individually.

Aspects of the above method include wherein the first wavelength switch is a dichroic filter switch.

Aspects of the above method include wherein the first wavelength switch is a spectral spatial filter switch.

Embodiments include a Lidar system, the Lidar system comprising: a laser emitter transmitting a first code of a first wavelength; a variable waveplate or other filter receiving the first code; a first wavelength filter switch filtering the first code received by the variable waveplate or other filter, wherein the first wavelength filter switch passes the first code at a first time; a receiver sensor receiving the filtered first code; the laser emitter transmitting a second code of a second wavelength; the variable waveplate or other filter receiving the second code; the first wavelength filter switch filtering the second code received by the variable waveplate or other filter, wherein the first wavelength filter switch passes the second code at a second time; the receiver sensor receiving the filtered second code; and a processor synchronizing the laser emitter based on the received filtered first and second codes.

Aspects of the above Lidar system include wherein the first and second codes are transmitted from the laser emitter through a second wavelength filter switch.

Aspects of the above Lidar system wherein the first and second codes are transmitted through a laser amplifier, wherein the first and second codes comprise high-power lasers.

Aspects of the above Lidar system include wherein a position of a target is tracked based on the received filtered first and second codes.

Aspects of the above Lidar system wherein filtering the first code comprises: receiving a backscattered code of a third wavelength, wherein the third wavelength differs from the first wavelength; and using the first wavelength filter switch to filter out the backscattered code.

Aspects of the above Lidar system wherein the third wavelength is the same as or similar to the second wavelength.

Aspects of the above Lidar system wherein the first and second codes are generated simultaneously, and a second wavelength filter switch is used to transmit each code individually.

Aspects of the above Lidar system wherein the first wavelength switch is a dichroic filter switch.

Aspects of the above Lidar system wherein the first wavelength switch is a spectral spatial filter switch.

Embodiments include a communication system, comprising: transmitting a first temporal code of a first wavelength and a first amplitude from a laser emitter; receiving, at a variable waveplate or other filter, the first temporal code; filtering, with a first wavelength filter switch, the first temporal code received by the variable waveplate or other filter; receiving the filtered first temporal code with a receiver sensor; transmitting a second temporal code of a second wavelength and a second amplitude from the laser emitter; receiving the second temporal code with the variable waveplate or other filter; filtering the second temporal code with the first wavelength filter switch; receiving the filtered second temporal code with the receiver sensor; and decoding the received filtered first and second temporal codes.

Aspects of the above communication system include wherein the first and second codes are transmitted from the laser emitter through a second wavelength filter switch.

Although embodiments of a Lidar system have been discussed that incorporate a wavelength filter switch to switch between lasers of different wavelengths, other configurations are possible. For example, any Lidar system that provides multiple lasers of different wavelengths can be used.

The foregoing discussion of the disclosed systems and methods has been presented for purposes of illustration and description. Further, the description is not intended to limit the systems and methods to the form disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use of the invention. It is intended that the appended claims be construed to include alternative embodiments to the extent permitted by the prior art.

What is claimed is:

1. A method of synchronizing a laser emitter, the method comprising:
    generating simultaneously a first code of a first wavelength and a second code of a second wavelength;
    transmitting, with a first wavelength filter switch, the first code of the first wavelength from the laser emitter toward a target;
    transmitting, with the first wavelength filter switch, the second code of the second wavelength from the laser emitter toward the target;
    receiving, at a variable waveplate or other filter, light, wherein the received light comprises one of the first code and the second code;
    determining, based at least in part on a distance to the target, an expected wavelength;
    receiving a backscattered code of a third wavelength, wherein the third wavelength differs from the first wavelength;
    determining the first wavelength is the expected wavelength;
    using a second wavelength filter switch to filter out the backscattered code; and
    based on the filtered received light, synchronizing the laser emitter.

2. The method of claim 1, wherein the first and second codes are transmitted by a laser.

3. The method of claim 1 further comprising tracking a position of the target based on the filtered received light.

4. The method of claim 1, wherein the third wavelength is the same as or similar to the second wavelength.

5. The method of claim 1, wherein the second wavelength filter switch is a dichroic filter switch.

6. The method of claim 1, wherein the second wavelength filter switch is a spectral spatial filter switch.

7. A communication system, the communication system comprising:
    a laser emitter transmitting a first code of a first wavelength toward a target through a first wavelength filter switch;
    the laser emitter transmitting a second code of a second wavelength through the first wavelength filter switch, wherein the first and second codes are generated simultaneously;
    a variable waveplate or other filter receiving light, wherein the received light comprises one of the first code and the second code;
    a processor determining, based at least in part on a distance to the target, an expected wavelength;
    the communication system receiving a backscattered code of a third wavelength, wherein the third wavelength differs from the first wavelength;
    the processor determining the first wavelength is the expected wavelength;

a second wavelength filter switch filtering the backscattered code from the received light and the processor synchronizing the laser emitter based on the filtered received light.

8. The communication system of claim 7, further comprising tracking a position of the target based on the filtered received light.

9. The communication system of claim 7, wherein the third wavelength is the same as or similar to the second wavelength.

10. The communication system of claim 7, wherein the second wavelength filter switch is a dichroic filter switch.

11. The communication system of claim 7, wherein the second wavelength filter switch is a spectral spatial filter switch.

12. A communication system, comprising:
   a laser emitter transmitting a first temporal code of a first wavelength and a first amplitude toward a target;
   the laser emitter transmitting a second temporal code of a second wavelength and a second amplitude from the laser emitter toward the target, wherein the first and second temporal codes are generated simultaneously, and a first wavelength filter switch is used to transmit each temporal code individually;
   a variable waveplate or other filter receiving light, wherein the received light comprises one of the first temporal code and the second temporal code;
   a processor determining, based at least in part on a distance to the target, an expected wavelength;
   a second wavelength filter switch filtering the received light based on the expected wavelength; and
   the processor decoding the received filtered first and second temporal codes.

13. The communication system of claim 12, wherein the processor tracks a position of the target based on the filtered received light.

14. The communication system of claim 12, wherein filtering the received light comprises:
   receiving a backscattered code of a third wavelength, wherein the third wavelength differs from the first wavelength;
   determining the first wavelength is the expected wavelength; and
   using the second wavelength filter switch to filter out the backscattered code.

15. The communication system of claim 14, wherein the third wavelength is the same as or similar to the second wavelength.

16. The communication system of claim 12, wherein the second wavelength filter switch is a dichroic filter switch.

17. The communication system of claim 12, wherein the second wavelength filter switch is a spectral spatial filter switch.

18. The communication system of claim 12, wherein the processor generates information associated with an object between the communication system and the target.

* * * * *